United States Patent

Benson

[15] 3,673,100

[45] June 27, 1972

[54] LIQUID SCINTILLATOR COMPOSITIONS FOR GAMMA-RAY COUNTING

[72] Inventor: Royal H. Benson, Texas City, Tex.
[73] Assignee: Monsanto Company, St. Louis, Mo.
[22] Filed: April 23, 1969
[21] Appl. No.: 818,784

Related U.S. Application Data

[63] Continuation-in-part of Ser. No. 720,451, April 11, 1968, Pat. No. 3,573,218.

[52] U.S. Cl..................252/301.3 R, 250/71 R, 250/71.5 R, 250/83 R, 250/83.1, 252/301.2 R, 252/351, 252/352, 252/408
[51] Int. Cl..........................................G01t 1/20, C09k 1/00
[58] Field of Search................252/301.3, 301.2, 2, 351, 352, 252/408

[56] References Cited

UNITED STATES PATENTS 3,506,828   4/1970   Hansen et al. ........................250/71.5

OTHER PUBLICATIONS

Patterson et al., Anal. Chem. 37, (1965), p. 854– 857

Primary Examiner—Delbert E. Gantz
Assistant Examiner—A. P. Demers
Attorney—C. James Bushman, Elizabeth F. Sporar and M. N. Cheairs

[57] ABSTRACT

A scintillator composition and method for liquid scintillation detection and counting of gamma-rays, said composition comprising, (1) a scintillator solution comprised of an aromatic hydrocarbon solvent, a scintillation solute and an ethoxylated alkyl phenol and, (2) a loading agent comprised of an aqueous solution of a compound of an element having an atomic number greater than twenty.

10 Claims, No Drawings

LIQUID SCINTILLATOR COMPOSITIONS FOR GAMMA-RAY COUNTING

BACKGROUND OF THE INVENTION

This is a continuation-in-part of copending application, Ser. No. 720,451 filed Apr. 11, 1968, now U.S. Pat. No. 3,573,218.

The present invention relates to liquid scintillation counting. More particularly, the present invention relates to an improved composition and process for the liquid scintillation detection and counting of gamma radiation.

In recent years, liquid scintillation counting of radiation has become a very popular industrial and research tool. Briefly, the liquid scintillation counting technique involves the interaction of radiation, usually with organic molecules, resulting in the emission of light pulses by the organic molecules, the light pulses being proportional to the amount of radiation. The light pulses are counted using suitable equipment and by this technique the radiation level is determined. Generally, the liquid scintillator used in the liquid scintillation counting process consists of a fluor dissolved in an aromatic solvent. While such scintillators are suitable for the measurement of low energy beta emitters such as $C^{14}$, $S^{35}$ and $H^3$, they are not suitable for the detection of relatively high-energy gamma-rays for the reason that such radiation is not sufficiently absorbed by the carbon-hydrogen-oxygen atoms normally found in such organic scintillators. This problem has been overcome to some extent by the addition of heavy metal containing compounds to the scintillator solution. The addition of a heavy metal to the organic scintillator increases the density of the solution thereby enabling the gamma-rays to be more efficiently absorbed in the medium and so detected. Unfortunately, since the scintillator solutions are organic in nature it is usually necessary to use organo-metallo compounds in order to achieve these "loaded" solutions. Organo-metallo compounds are generally quite expensive to prepare, frequently very toxic and difficult to handle and oftentimes it is still not possible to have a high enough concentration of the particular metal present to insure adequate absorption of the gamma radiation.

SUMMARY OF THE INVENTION

In the above referred to copending application is disclosed a liquid scintillation counting composition to which can be added a gamma-capture solute often called a "loading agent." It has now been discovered that the liquid scintillator composition disclosed in the above-identified application when combined with certain loading agents produce safe, inexpensive compositions which are excellent for the counting and detection of gamma-rays and are particularly valuable for large volume gamma radiation detecting systems.

It is, therefore, an object of the present invention to provide an improved liquid scintillator composition for the detection and counting of gamma-rays, said composition having high gamma-capture efficiency.

It is also an object of the present invention to provide a composition for the liquid scintillation detection and counting of gamma radiation which is easier to prepare than prior art compositions, inexpensive and safe.

Still a further object of the present invention is to provide an improved method for the liquid scintillation detection and counting of gamma-rays.

Additional objects will become apparent from the description given herein and the appended claims. The present invention in one of its embodiments is a composition for use in liquid scintillation detection and counting of gamma-rays comprising at least 30 per cent by weight of a scintillator solution, said scintillator solution comprising an aromatic hydrocarbon solvent, a scintillation solute and an ethoxylated alkyl phenol wherein the alkyl substituent contains from seven to 16 carbon atoms and the ratio of the number of carbon atoms in said alkyl substituent to the average number of ethoxy groups in said ethoxylated alkyl phenol is from 0.83 to 1.67; and a loading agent, said loading agent comprising an aqueous solution of a compound of an element having an atomic number greater than 20.

In another embodiment, the present invention provides an improvement in a liquid scintillation counting process for the detection of gamma-rays wherein a loading agent is added to a scintillator solution to increase the absorption of said gamma-rays which comprises using a scintillator solution comprised of an aromatic hydrocarbon solvent, a scintillation solute and an ethoxylated alkyl phenol wherein the alkyl substituent contains from seven to 16 carbon atoms and the ratio of the number of carbon atoms in said alkyl substituent to the average number of ethoxy groups in said ethoxylated alkyl phenol is from 0.83 to 1.67; and a loading agent comprised of an aqueous solution of a compound of an element having an atomic number greater than twenty.

DESCRIPTION OF THE PREFERRED EMBODIMENTS

The compositions of the present invention are comprised of two basic parts, the scintillator solution and the loading agent. The scintillator solution in general contains an aromatic solvent, an ethoxylated alkyl phenol and a scintillation solute while the loading agent is an aqueous solution of a compound of certain elements.

The ethoxylated alkyl phenols useful in preparing the scintillator solution can be depicted structurally as follows:

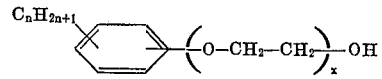

wherein $n$ is from 7 to 16 and $x$ represents the average number of ethylene oxide groups per molecule. The value of $x$ will, of course, vary depending on the number of carbon atoms in the alkyl substituent. In general, however, the value of $x$ will be such that the value of $n/x$ will be from 0.83 to 1.67. Examples of suitable ethoxylated alkyl phenols and preferred ranges of $n/x$ include ethoxylated heptyl phenol having a range of from 0.83 to 1.08, ethoxylated octyl phenol having a range of from 0.83 to 1.11, ethoxylated nonyl phenol having a range of from 0.89 to 1.11, ethoxylated decyl phenol having a range of from 0.90 to 1.17, ethoxylated hendecyl phenol having a range of from 0.93 to 1.22, ethoxylated dodecyl phenol having a range of from 0.93 to 1.27, ethoxylated tridecyl phenol having a range of from 0.97 to 1.34, ethoxylated tetradecyl phenol having a range of from 1.08 to 1.55, ethoxylated pentadecyl phenol having a range of from 1.15 to 1.67 and ethoxylated hexadecyl phenol having a range of from 1.33 to 1.51. As above stated, x represents an average number of ethoxy groups per molecule. Thus, for example, when speaking of an ethoxylated alkyl phenol having 10.0 ethoxy groups, there will be present molecules having both more and less than 10 ethoxy groups.

The ethoxylated alkyl phenols useful in the present invention as well as methods for their preparation are well known. Usually, the ethoxylated alkyl phenols are prepared by condensing ethylene oxide with the desired alkylated phenol. It is generally preferred for the ethoxylated alkyl phenols of the present invention to be comprised mainly, that is, above 50 percent of the para form. However, it is especially preferred to use those where at least 80 percent of the ethoxylated alkyl phenol is in the para form with the remainder being substantially comprised of the ortho form.

The solvents generally found to be useful in preparing the scintillator solution are the liquid aromatic hydrocarbons. Non-limiting examples of the latter include benzene, toluene, o-, m-, p-xylenes and mixtures thereof, cumene, the ethylbenzenes and mesitylene. In particular, xylene, toluene and ethylbenzene have been found to give the highest counting efficiency. Especially preferred solvents are the xylenes, i.e., the ortho, meta or para isomers either alone or mixed. The volume ratio of solvent to the ethoxylated alkyl phenol useful in preparing the scintillation solution will generally be from 3:1 to 1:1. The ratio used will be determined by the sample stability requirements, the temperature at which the samples are measured, the counting efficiency requirements and the percentage of sample desired to be measured. The most useful ratios of solvent to ethoxylated alkyl phenol range from 2.4:1 to 1.6:1.

The scintillation solutes which may be used in preparing the scintillator solution are those which are well known in the art and the present invention is not to be construed as limited to the use of any particular scintillation solute. These scintillation solutes may be comprised of only a fluor or may also contain a secondary solute such as a spectrum shifter or wavebank shifter. Some of the more well known fluors which are useful in the present invention are those selected from the group consisting of p-terphenyl, the oxazoles and the oxadiazoles. Probably, the best known oxadiazole fluor is PBD [2-(4-biphenylyl)-5-phenyl-1,3,4-oxadiazole] and the most well known oxazole fluor is PPO [2,5-diphenyloxazole]. Some of the better known secondary solutes which may be combined with the fore-going primary solutes are POPOP [1,4-bis-2-(5-phenyloxazolyl)-benzene], alpha-NOPON [p-bis-2-(5-[1-naphthyloxazolyl)-benzene], DPH [1,6-diphenyl-1,3,5-hexatriene], alpha-NOP [2-)1-naphthyl)-5-phenyloxazole], and MSB [p-bis-(o-methylstyryl)-benzene]. Another scintillation solute which has been mentioned in the prior art is m-terphenyl plus 0.5 percent anthracene. The scintillation solutes need only be present in amounts sufficient to enable the compositions of the present invention to be useful as liquid scintillators. The optimum amount will vary according to the particular component or components making up the scintillation solute and the amount will generally be a balance between cost, solubility, and performance requirements. The scintillation solute will generally be present in amounts of from 0.5 to 50 grams per liter but more often will be present in amounts from 1 to 12 grams per liter. It is especially that the scintillation solutions of the present invention contain about 4 to 6 grams per liter of scintillation solute. When speaking of only primary solutes or fluors, these are generally present in amounts of about 0.5 to 12 grams per liter of the scintillator solution. Secondary solutes are generally present in relatively small amounts as compared to the fluors, that is, from about 0.05 to 3 grams per liter. The preferred scintillation solute of the present invention is comprised of PPO and MSB.

The scintillator solution will comprise at least 30 percent by weight and preferably from 40 to 99 percent by weight of the total scintillator composition.

The compounds chosen to prepare the loading agents of the present invention will ideally possess the characteristics of high density and good water solubility, the former characteristic being substantially met by a compound of any element having an atomic number above twenty. As a general rule, the higher the density of the compound used, the higher the density of the overall scintillator composition and, accordingly, the more efficient the gamma-ray capture ability. There are numerous compounds which possess the above enumerated characteristics regarding atomic number of the element and water solubility. No attempt will be made to list all possible compounds, however, following are some typical examples of commonly available compounds which are suitable: the water soluble halides, acetates and nitrates of cadmium, lead, zinc, cesium and barium; the nitrites, nitrates and acetates of silver and gold; the bromides and iodides of sodium, potassium and lithium.

When a compound of an element having an atomic number greater than twenty is present in the scintillator solution, the high-energy gamma-rays entering are in effect "slowed" by collisions with said elements. These collisions reduce the energy of the gamma-rays such that they are then able to interact with the organic scintillator to produce scintillation light which can then be measured by conventional liquid scintillation counting techniques.

In preparing the loading agents of the present invention, it is preferable to have the water soluble compounds of the particular element present in as high a concentration as possible to insure maximum gamma-capture and consequently high-detection efficiency. Preferably, therefore, a concentrated solution of the particular compound is used; however, dilute aqueous solutions of the compounds can also be employed. For example, an aqueous solution containing at least 10 percent by weight of the compound chosen will give satisfactory results. The amount of the compound in the loading agent will to some extent be dependent on the water solubility thereof. Generally, however, loading agents are employed which contain, by weight, from 10 to 90 percent of the maximum amount of the compound, also by weight, soluble in water at the temperature at which the scintillator composition is to be used.

The loading agent is present in the composition of the present invention in amounts ranging from 1 up to 70 but more usually from 1 to 60 percent by weight.

In preparing the compositions herein, the scintillator solution and the loading agent are simply mixed together until a clear solution or gel is obtained. While the scintillator solution, the water and the particular compound, the latter two going to make up the loading agent, can all be mixed simultaneously, it is preferred to first prepare the loading agent by dissolving the compound in water followed by adding the aqueous solution, i.e., the loading agent, to the scintillator solution. In order to illustrate the invention further, the following examples are presented. In all cases the compositions were counted using a $Cs^{137}$ gamma-ray source and a Tri-carb Model 3310 Spectrometer manufactured by Packard Instrument Company.

EXAMPLE 1

A scintillator solution was prepared using ethoxylated nonyl phenol having an average of 9.2 ethoxy groups per molecule and a n/x ratio of 1.02 and xylene as a solvent. A volume ratio of xylene to the ethoxylated nonyl phenol of 1.7 was employed. The scintillator solution contained as the scintillation solute 0.55 percent (wt/vol) of PPO and 0.20 percent (wt/vol) of MSB.

A loading agent was prepared by dissolving 4.5 grams of zinc bromide in 10 ml of water.

A scintillator composition was then prepared by mixing 10 ml of the above scintillator solution with 10 ml of the above loading agent. The resulting scintillator composition gave a counting rate of 1,734 counts per second.

EXAMPLE 2

The scintillator solution of Example 1 was used to prepare a scintillator composition by mixing 10 ml of said solution with 10 ml of a loading agent comprised of 10 grams of zinc bromide per 10 ml of water. The resulting scintillator composition gave a counting rate of 1998 counts per second.

EXAMPLE 3

The scintillator solution of Example 1 was used to prepare a scintillator composition by mixing 10 ml of said solution with 10 ml of a loading agent comprised of 15 grams of zinc bromide per 10 ml of water. The resulting scintillator composition gave a counting rate of 2,145 counts per second.

EXAMPLE 4

The scintillator solution of Example 1 was used to prepare a loaded scintillator composition by mixing 10 ml of said solution with 10 ml of a loading agent comprised of 4 grams of sodium iodide per 10 ml of water. The resulting scintillator composition gave a counting rate of 1,725 counts per second.

EXAMPLE 5

A commercially available liquid gamma-ray counting solution containing 5 percent (by weight) lead in the form of an organic lead compound was used with the $Cs^{137}$ gamma-ray source. The solution gave a counting rate of 1,464 counts per second.

As can be seen from a comparison of the data in the above examples, the scintillator compositions of the present invention are vastly superior to presently available liquid gamma-ray counting solutions.

The scintillator compositions disclosed herein find particular use in large volume counting systems such as human radiation counters where they can be used in place of inorganic crystals such as sodium iodide (T1) which are normally used. Crystals of such materials, large enough for use in human counters and the like, are extremely expensive and very difficult to obtain. Since the scintillator compositions herein are very effective in absorbing gamma-rays they enable the construction of large volume counters at much less price then experienced using the above solid crystals or presently available liquid compositions.

What is claimed is:

1. A scintillator composition for use in liquid scintillation counting of gamma-rays comprising
    at least 30 percent by weight of a scintillator solution, said scintillator solution comprising an aromatic hydrocarbon solvent, a scintillation solute and an ethoxylated alkyl phenol wherein the alkyl substituent contains from seven to 16 carbon atoms and the ratio of the number of carbon atoms in said alkyl substituent to the average number of ethoxy groups in said ethoxylated alkyl phenol is from 0.83 to 1.67, the volume ratio of said hydrocarbon solvent to said ethoxylated alkyl phenol in said scintillator solution being from 3:1 to 1:1 and said solute being present in an amount of from 0.5 to 50 grams per liter of said scintillator solution; and
    from 1 to 70 percent by weight of a loading agent, said loading agent comprising an aqueous solution of a water-soluble compound of an element having an atomic number greater than 20.

2. The composition of claim 1 wherein said scintillator solution is present in an amount of from 40 to 99 percent by weight and said loading agent is present in an amount of from 1 to 60 percent by weight.

3. The composition of claim 2 wherein said aqueous solution contains, by weight, from 10 to 90 percent of the maximum amount of said compound, expressed as weight per cent, soluble in water at the temperature at which said scintillator composition is to be used.

4. The composition of claim 3 wherein the aromatic hydrocarbon solvent is xylene.

5. The composition of claim 4 wherein said scintillation solute is present in an amount of from 1 to 12 grams per liter of said scintillator solution and is comprised of a fluor and a wave-band shifter.

6. The composition of claim 5 wherein said scintillation solute comprises PPO and MSB.

7. In a liquid scintillation counting process for the detection of gamma-rays wherein a loading agent is added to a scintillator solution to increase the absorption of said gamma-rays, the improvement which comprises using a scintillator solution comprised of an aromatic hydrocarbon solvent, a scintillation solute and an ethoxylated alkyl phenol wherein the alkyl substituent contains from seven to 16 carbon atoms and the ratio of the number of carbon atoms in said alkyl substituent to the average number of ethoxy groups in said ethoxylated alkyl phenols is from 0.83 to 1.67, the volume ratio of said hydrocarbon solvent to said ethoxylated alkyl phenol in said scintillator solution being from 3:1 to 1:1 and said solute being present in an amount of from 0.5 to 50 grams per liter of said scintillator solution; and
    from 1 to 70 percent by weight of a loading agent comprised of an aqueous solution of a water soluble compound of an element having an atomic number greater than 20.

8. The process of claim 7 wherein said scintillator solution is present in an amount of from 40 to 99 percent by weight and said loading agent is present in an amount of from 1 to 60 percent by weight.

9. The process of claim 8 wherein said aqueous solution contains, by weight, from 10 to 90 percent of the maximum amount of said compound, expressed as weight per cent, soluble in water at the temperature at which said scintillator solution and said loading agent are to be used.

10. The process of claim 8 wherein said scintillation solute is present in an amount of from 1 to 12 grams per liter of said scintillator solution and is comprised of a fluor and a wave-band shifter.

* * * * *